Figure 1:
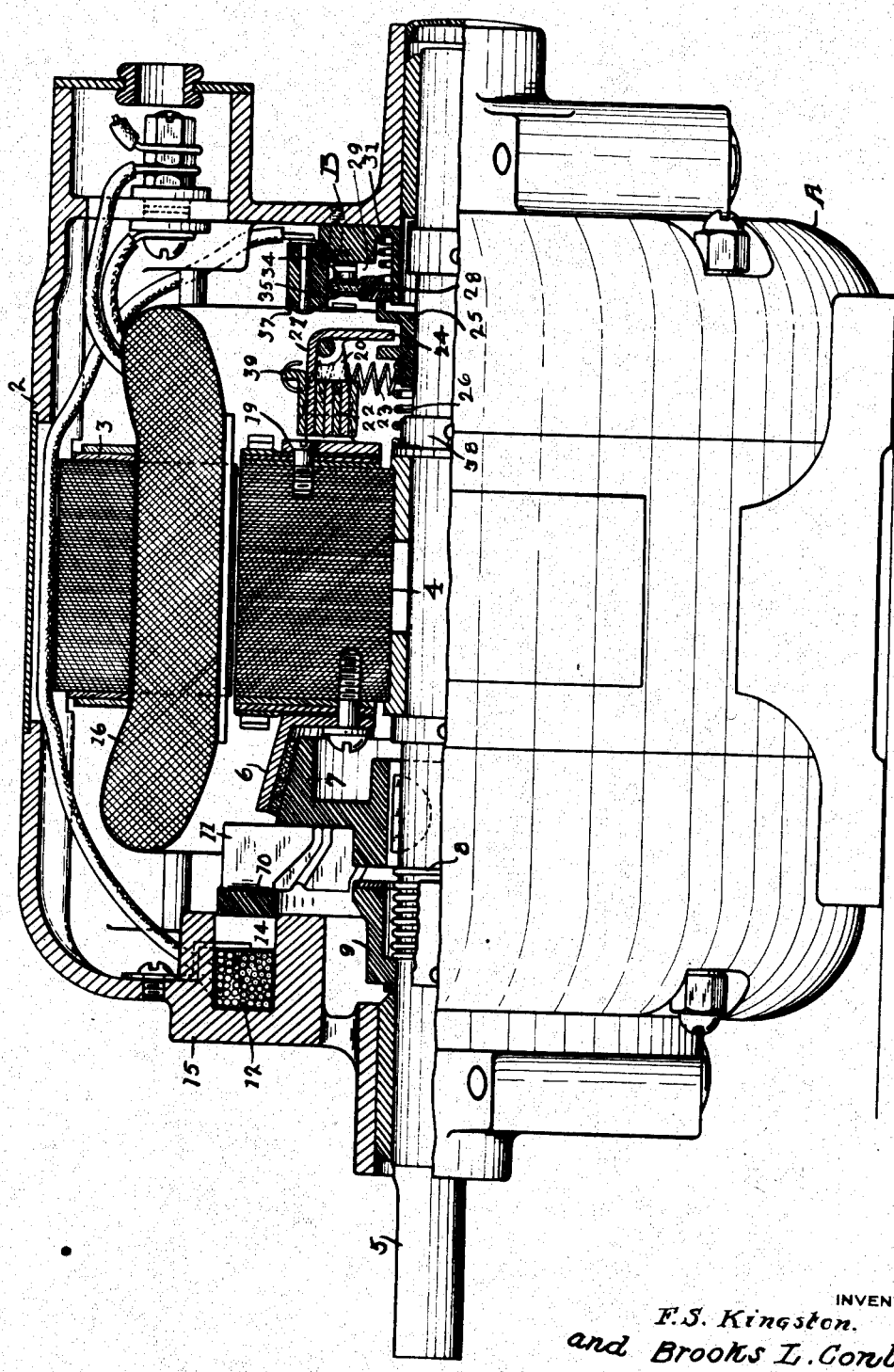

June 28, 1932.  F. S. KINGSTON ET AL  1,864,654
ELECTRIC SWITCH
Filed April 19, 1930   2 Sheets-Sheet 1

INVENTOR
F. S. Kingston.
and Brooks L. Conley,
Fisher, Moser & Moore
ATTORNEYS.

June 28, 1932.　　　F. S. KINGSTON ET AL　　　1,864,654
ELECTRIC SWITCH
Filed April 19, 1930　　　2 Sheets-Sheet 2
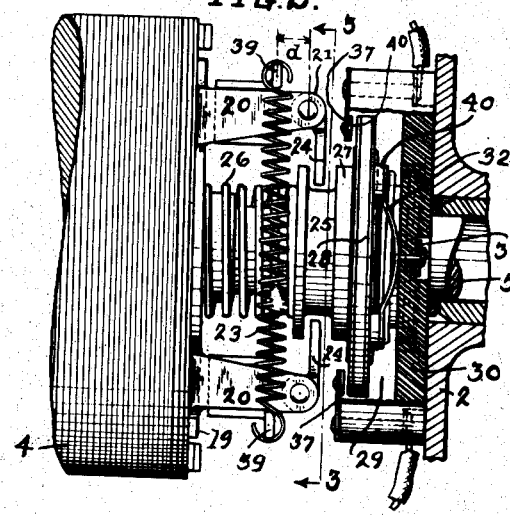
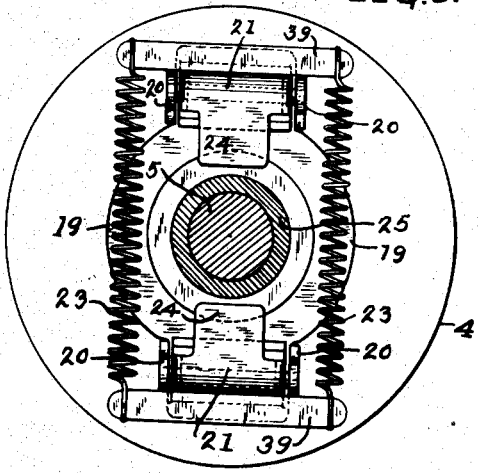
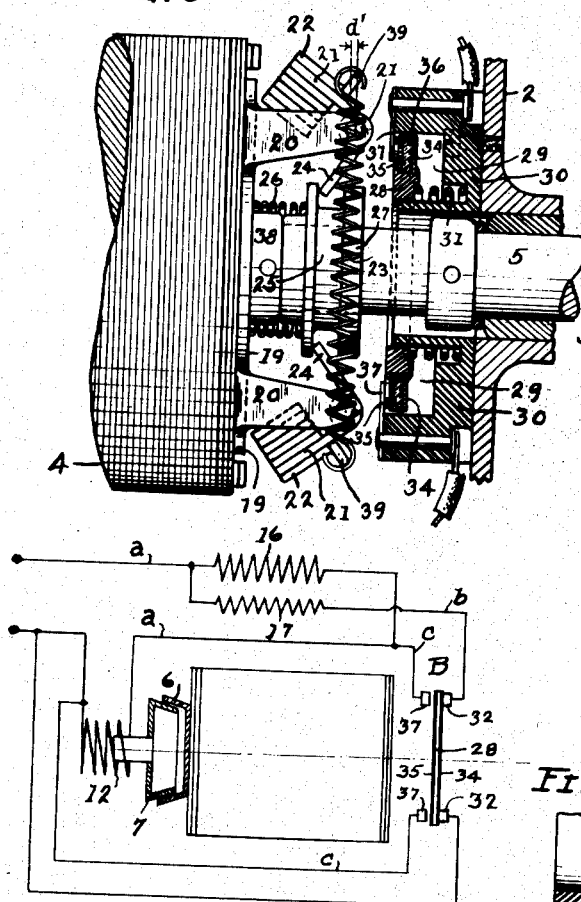
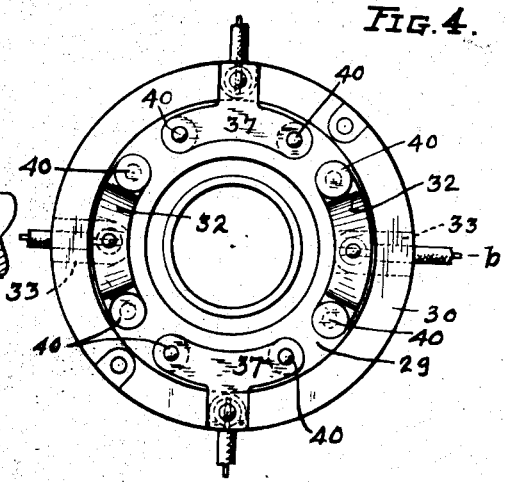
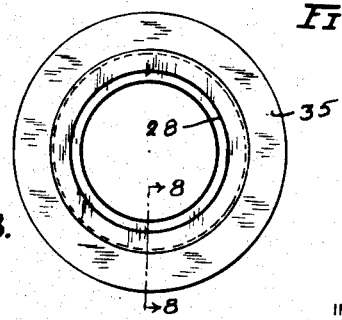
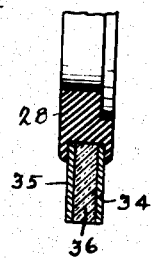
INVENTOR
F. S. Kingston.
and Brooks L. Conley,
Fisher, Moser & Moore
ATTORNEYS.

Patented June 28, 1932

1,864,654

UNITED STATES PATENT OFFICE

FREDERICK S. KINGSTON AND BROOKS L. CONLEY, OF WARREN, OHIO, ASSIGNORS TO THE SUNLIGHT ELECTRICAL & MANUFACTURING COMPANY, OF WARREN, OHIO, A CORPORATION OF OHIO

ELECTRIC SWITCH

Application filed April 19, 1930. Serial No. 445,667.

The present invention pertains to electric switches, and more particularly to centrifugal or speed responsive switches for electric motors, for example, single phase induction motors or motors which employ a split-phase method of starting. Thus the present switch is especially applicable to and useful in an induction motor in which separate circuits are switched on and off and/or short-circuited automatically to promote starting and running operations, say substantially as exemplified in the co-pending application of F. S. Kingston, Serial No. 431,750, filed Feb. 27, 1930, for an induction motor in which an electro-magnet or a resistance winding is used. That particular motor includes normally-engaged clutch members and a releasing magnet having a winding connected in series relation with the main field winding and adapted to be short-circuited by a centrifugal switch when the motor comes up to speed, and the auxiliary starting winding for the motor is also cut in and out by the same switch. Also, the present automatic switch is especially designed to make and break the respective circuits in a motor of that type, at different speeds, that is, to change the connections from starting to running positions at a relatively high speed and from running to starting positions at a considerable lower speed, thereby effecting a time dwell in switching operations which is conducive to better results and a proper performance of the motor.

A preferred embodiment of the invention is shown in the accompanying drawings. Thus, Fig. 1 is a side view and sectional view of an electric motor having the present switch incorporated therein, and Fig. 2 shows the switch itself partly in elevation and partly in section and in a starting or non-rotating position. Fig. 3 is an end view and cross section on line 3—3 of Fig. 2, looking toward the left, and Fig. 4 an end view of the switch body at the right of Fig. 2, without the contact disk and motor shaft. Fig. 5 is a side and sectional view corresponding in part to Fig. 2, showing the switch parts in their running position, or when the motor is up to speed. Fig. 6 is a front elevation of the contact disk alone. Fig. 7 is a schematic electrical diagram of a motor circuit, including the present switch, and Fig. 8 is a sectional view of the contact disk enlarged, on line 8—8 of Fig. 6.

The motor A delineated in Fig. 1 comprises a casing 2 having a laminated stator 3 therein, and a rotor 4 mounted to revolve freely on a motor shaft 5 having rotatable bearing in the opposite ends of the casing. Rotor 4 is coupled to shaft 5 by a clutch which comprises a flanged member 6 fixed to rotor 4, and a second flanged member or friction cone 7 slidably keyed to the shaft. A coiled compression spring 8 is interposed between the slidable member 7 and a collar 9 on the shaft to hold the two clutch members normally in driving engagement. A ring armature 10 is secured in spaced relation to the cone by radial ribs or fan blades 11, and this armature is supported rotatably opposite a magnet winding or coil 12 confined within the base of a channel 14 in an annular enlargement 15 on the casing. The motor includes a main winding 16 and an auxiliary starting winding 17, see the diagram in Fig. 7. The main winding is connected in series relation with the magnet coil 12 in a closed circuit $a$, and the auxiliary starting winding 17 is connected in a parallel circuit $b$ which includes the present centrifugal switch B. Starting of the motor is effected with both circuits $a$ and $b$ closed, and then when the rotor reaches a predetermined speed of revolution, circuit $b$ is opened and a short circuit $c$ established for magnet coil 12 by the operation of centrifugal switch B.

Structurally considered, switch B comprises a circular flat plate 19 attached to one end of rotor 4, having two pairs of parallel arms 20 bent outwardly therefrom to pivotally support two bell cranks 21—21 at opposite sides of the motor shaft. Each bell crank has a weight 22 affixed thereto to cause it to swing outwardly on its pivot when the rotor revolves, and two coiled springs 23 connect the two bell cranks to resist such swinging movement. Each bell crank has an arm 24 extending toward the shaft and loosely engaged with a grooved sleeve 25 free to slide on the shaft. A coiled compression spring 26 is interposed between rotor 4 and sleeve 25 whereby an end flange 27 on the sleeve is caused to press against the flat face of a floating disk 28 of ring shape confined within in a circular recess 29 in a stationary switch body 30 secured to one end of the motor casing 2. A second coiled spring 31 is interposed between the floating disk 28 and body 30 but this spring is of less power than spring 26 so that when the rotor is at rest or not revolving rapidly the disk 28 will be pressed firmly against a pair of arched spring contacts 32 attached to body 30 at the base of recess 29. Terminal plates 33 are united to the spring contacts 32 and extend outwardly into the rim of body 30 to permit the electrical conductors in circuit $b$ to be connected therewith. Accordingly, this circuit is closed at the beginning of starting operations inasmuch as the two spring contacts 32 are held in contact at this time with a conductor ring 34 carried at one side of disk 28. A second conductor or contact ring 35 is mounted on the opposite side of disk 28 and insulated from ring 34 by mica 36 or some other suitable nonconducting substance. The second contact ring 35 is adapted to engage a second set of spring contact blades 37 of arcuate shape supported on body 30 at the front of recess 29 and electrically connected in the short-circuit $c$ for the resistance or reactance device 12 connected in series with main winding 16. Thus, when the motor is at rest or not revolving at high speed the conductor ring 34 on floating disk 28 is pressed against the spring contacts 32, and the ring conductor 35 on the opposite side of the disk is spaced apart or separated from the other set of spring contact blades 37, thereby permitting the current to flow through all three windings 12, 16, and 17 in starting operations. Then as the rotor accelerates its speed rapidly and reaches a predetermined rate of revolution per minute the centrifugal switch elements 21 will swing outwardly and draw sleeve 25 apart from disk 28, thereby permitting spring 31 to shift the disk into engagement with the short-circuiting spring contacts 37 in circuit $c$. The travel of sleeve 25 is limited by a collar 38 on the motor shaft, thereby also limiting the rotatable movements of the centrifugal elements or weighted bell cranks 21 on their respective pivots, as indicated in Fig. 5. This is the normal position of the switch parts when the motor is running up to speed at which time the conductor disk 28 is pressed by spring 31 against the stationary contacts 37 to short-circuit the magnet winding 12 promptly after open-circuiting the starting winding 17.
Sleeve 25, spring 26, and collar 38 are shown mounted on the motor shaft, which is a preferred construction but they could be mounted elsewhere without changing the fundamental features of the switch. The centrifugal bell crank members are also shown as having cross pieces or lateral projections 39 to which the controlling springs 23 are connected, and these cross pieces are adapted to engage the supporting arms 20 and limit the tilting movement of the bell cranks inwardly under the tension of said springs. Preferably springs 23 are connected relatively near the pivot points of the bell cranks so that the axes of the springs will be placed near or in the same plane as said pivot points when the rotor is running up to speed with the centrifugal elements swung outwardly to their limit. In that way a higher rotor speed is required to move the weights from starting position to the running position than to reverse their movements from a running to the starting position. In other words, by properly locating the points of connection of the springs 23 with respect to the bell crank pivots, the moments of the spring forces about the pivots will be less in the running position of the switch than in the starting position. Thus the present switch is designed to change the electrical connection from starting to running at a relatively high speed, say at 1600 R. P. M. and from running to starting at a much lower speed, for example, 600 R. P. M. thereby producing a considerable time-lag in operations which is desirable and advantageous in operating an induction motor, especially a motor using a clutch.

The same speed difference can also be accomplished by locating the centers of gravity of the bell crank members and their attached weights, so that the moments of the centrifugal forces about the pivots will be greater at a given speed in the running position than in the starting position, in other words, the speed for a given moment of centrifugal force in the running position will be less than the speed required to give the same moment of centrifugal force in the starting position. To accomplish this, the bell cranks and attached weights would be so designed that the perpendicular distance between the plane of the centers of gravity and plane of pivots (both planes at right angles to axis of shaft) is greater in the running position than in the starting position. This design or arrangement of weights may also be combined with springs located to vary the moments of the spring forces about the pivots as the switch position changes.

In the switch illustrated in the drawings, when the axes of the springs 23 are in the same plane or substantially close to the pivots of the bell crank members each spring exerts a moment of force equal to the spring tension times the moment arm, which is the perpendicular distance from the center line through the pivot to the line of force through the spring, see Fig. 5. In Fig. 2 the switch is shown in the starting position and the moment arm of spring 23 is distance $d$, and in Fig. 5 the switch is in a running position with a shorter moment arm as indicated by $d'$. The difference in distance is such that the moments of the springs 23 are appreciably less when running than at starting, even though the springs are somewhat lengthened or stretched when the motor is running. The force moments of the springs 23 can be made zero if desired by making the axes of the springs pass through the center line of the pivots, or the switch can be so designed that the axes of the springs lie on one side of the pivots in starting and then shifted to the other side of the pivots in running. In the latter case, the coiled spring 26 would be relied on to bring the switch back to the starting position when the rotor speed was considerably reduced or the motor stopped. The groove in sleeve 25 is also made to provide a small amount of free play for the bell crank arms so that the bell crank members may swing outwardly a short distance under the influence of centrifugal force without shifting the sleeve and compressing spring 26 in starting the motor, although such free play is not absolutely essential. The switch may also be readily modified for use with other kinds of split phase motors by omitting one set of contacts. Preferably each contact member is made of a spring strip in arcuate shape or bowed, and supported centrally between the ends thereof to equalize the pressure thereon. Each contact strip is also provided with a pair of contact pieces 40 to assure good contact results and ample area of conductivity.

The specific clutch structure shown in Fig. 1 of the drawings is claimed in Frederick S. Kingston Patents, No. 1,853,864 and No. 1,855,865 that issued on April 12, 1932 and is also specifically claimed in the copending application of Frederick S. Kingston, Serial No. 603,809 filed April 7, 1932.

What we claim, is:

1. In a centrifugal switch, a rotor, a centrifugal device pivoted to said rotor, a controlling spring connected with said device to produce a considerable time lag in operations at different rates of rotor speeds, a sleeve adapted to be shifted by said centrifugal device, a second controlling spring engaged with said sleeve to co-act with said first controlling spring, a shiftable contact disk adapted to be engaged by said sleeve, a spring for controlling the movement of said disk, and electrical contacts adapted to be engaged and disengaged by said disk.

2. In a centrifugal switch, a rotor member, a pair of centrifugal devices pivoted oppositely on said rotor member, tension springs connecting said devices near their respective pivots and arranged to move to the same plane in which the pivots lie when under the influence of centrifugal force at a high rotor speed, a sleeve adapted to be shifted by said centrifugal devices, a compressible spring engaging said sleeve and supplementing said tension springs, a contact disk adapted to be shifted by said sleeve, a spring controlling the movement of said disk, and electrical contacts adapted to be engaged by said disk.

3. In a centrifugal switch, a rotor having a pair of centrifugal elements pivoted thereto, tension springs connecting said elements, a shiftable sleeve operatively engaged by said elements, a supplemental spring controlling the movement of said sleeve, a floating disk having contact rings on opposite sides thereof, a controlling spring for said disk, and separate sets of electrical contacts adapted to be engaged alternately by said contact rings when said disk is shifted in opposite directions.

4. In a centrifugal switch, a stationary body having separate spring strips supported centrally between their ends upon said body and provided with a contact portion at each end of each strip, and a contact disk movably supported opposite said spring contact strips, in combination with a rotor having centrifugal devices thereon arranged to shift said disk in respect to said contact strips.

5. In a centrifugal switch, a stationary body having a recess and separate sets of arcuate contact strips supported radially thereof within said recess, a floating disk within said recess having ring conductors on opposite sides thereof adapted to engage said contact strips, and a spring pressing said disk normally against one set of said contact strips, in combination with a rotor, and a set of spring-controlled centrifugal members having a spring-pressed sleeve normally engaged with said disk and adapted to be separated therefrom when the rotor is revolved rapidly.

6. In a centrifugal switch, a stationary body having a circular recess therein, yieldable contact members supported radially at the front and rear of said recess, a floating ring-shaped disk within said recess having ring conductors opposite said contact members, and a compression spring interposed between said disk and body, in combination with a rotor having weighted bell cranks pivoted thereon, tension springs connecting said bell cranks, and a spring-pressed sleeve operatively connected with said bell cranks and normally engaged with said disk.

7. A centrifugal switch for electric motors, comprising separate sets of electrical contacts for controlling separate circuits, a contact ring movable back and forth in respect to said separate sets of contacts, means for pressing said ring yieldingly against one set of contacts to maintain a closed circuit in starting the motor, and means responsive to the motor speed for shifting said ring to the other set of contacts and maintaining engagement therewith during running speeds of the motor.

8. A centrifugal switch for electric split-phase motors, comprising spaced sets of electrical contacts for controlling a starting circuit and a running circuit, a shiftable contact ring engaged with one set of contacts to provide a closed starting circuit, and means responsive to the motor speed for shifting said ring into engagement with a second set of contacts for controlling the running circuit, said means being constructed and arranged to change the connections from starting to running position at a relatively high speed and from running to starting positions at a considerably lower speed.

9. A centrifugal switch for induction motors comprising, in combination, a collar slidable on the motor shaft, centrifugal devices carried by said rotor having members arranged to cooperate with and move said collar toward said rotor upon increase in rotor speed, means yieldingly opposing the movement of said collar toward said rotor, a stationary annular switch body secured to the motor frame, a floating contact disk movable axially of the rotor shaft within the annular recess of said switch body, means yieldingly tending to move said disk toward said collar, contact members extending into the annular recess formed within said switch body on each side of said disk, the yielding pressure on the collar and disk being such that said collar will normally cause said disk to contact with the contact members on the side thereof away from said rotor, said centrifugal device being arranged when the motor is up to speed to move said collar out of contact with said disk to permit said disk to contact with the contact members toward the rotor.

10. A centrifugal switch for motors comprising, in combination, an annularly grooved collar slidable on the motor shaft, brackets secured to the rotor extending outwardly over said shaft on opposed sides thereof, a pair of bell cranks journaled in said brackets, each said bell crank having an arm extending radially inwardly into the annular recess in said collar, and a weighted arm extending toward said rotor, tension springs connecting said weighted bell crank arms, means limiting the extent of inward movement of said collar toward said rotor, a compression spring interposed between said collar and said rotor, a stationary switch body secured to the motor frame in axial alignment with said collar, said switch body having a cylindrical bearing surface extending toward said rotor and collar, an annular contact disk slidable on said bearing surface, contact members carried by said switch body extending radially inwardly intermediate said contact disk and rotor arranged to contact with one side of said disk, additional contact members intermediate said contact disk and motor frame arranged to contact with the opposed side of said contact disk, and a compression spring intermediate said contact disk and motor frame.

11. In a centrifugal switch for electric motors in combination, a centrifugal controller including a pivoted arm, a yielding counterbalancing means exerting a thrust upon said arm in opposition to centrifugal force and so disposed with respect to the pivotal axis of the arm that upon predetermined movement of said arm in response to centrifugal force the counterbalancing thrust is brought substantially into a line passing through the pivotal axis of said arm, and a switch member actuated by movement of said arm.

12. In a centrifugal switch for electric motors, in combination, a centrifugal controller including a pivoted arm, a yielding counterbalancing means exerting a thrust upon said arm in opposition to centrifugal force and so disposed with respect to the pivotal axis of the arm that upon a predetermined movement of the arm in response to centrifugal force the counterbalancing thrust is shifted across the pivotal axis of the arm to reverse the action of the counterbalancing means, and a switch member actuated by movement of said arm.

13. In centrifugal switch mechanism for electric motors, in combination, a pair of pivoted arms having weights thereon, tension springs connecting said pivoted arms intermediate the pivotal axis of said arms and the centers of gravity of said weights at such points that upon a predetermined outward movement of said weighted arms in response to centrifugal force, said springs pass substantially through dead center position with respect to the pivotal axes of said arms, and a switch member shiftable axially of the shaft of said motor in response to movement of said pivoted arms.

14. In switching mechanism for electric motors, in combination, a contact member, a second contact member spaced from the first contact member, contacting means movable in a guided path intermediate said contact members, a first shifting means yieldingly holding said movable contacting means in electrical engagement with one of said contact members, a second shifting means arranged to overcome said first shifting means and to shift said movable contacting means away from the first contact member into electrical contact with the second contact member, and means actuated at a predetermined rotational speed of the motor for rendering said second shifting means inoperative.

15. In switching mechanism for electric motors, in combination, two spaced stationary contact members, a contacting means movable axially of the motor shaft intermediate said contact members, means arranged to hold said movable contacting means yieldingly in electrical engagement with one of said stationary contact members, a second shifting means arranged to shift said movable contacting means and to hold the same in electrical engagement with the other contact member when said former shifting means is inoperative, and means actuable when the motor has reached a predetermined speed of rotation to render the former shifting means inoperative.

16. In switching mechanism for electric motors, in combination, a bracket, a contact member carried by said bracket, a second contact member carried by said bracket spaced from the first named contact member, shiftable contacting means disposed intermediate said contact members and shiftable axially into engagement with one or the other of said contact members, resilient means for shifting said contacting means into electrical engagement with the first contact member, a second resilient means opposing the first resilient means and arranged to overcome the same to shift said contacting means into electrical engagement with said second contact member, centrifugally operated mechanism controlled by the speed of rotation of the armature of said motor arranged to oppose said second resilient means and render the same inoperative to shift said contacting means.

In testimony whereof we affix our signatures.

FREDERICK S. KINGSTON.
BROOKS L. CONLEY.